United States Patent [19]
Riemersma et al.

[11] Patent Number: 5,302,073
[45] Date of Patent: Apr. 12, 1994

[54] LIFT AND SEAL DRUM DUMPER

[75] Inventors: Keith A. Riemersma; Philip S. Keller; Steven C. Nyland, all of Holland, Mich.

[73] Assignee: National Bulk Equipment, Inc., Holland, Mich.

[21] Appl. No.: 932,659

[22] Filed: Aug. 20, 1992

[51] Int. Cl.$^5$ .............................. B65G 65/34
[52] U.S. Cl. .................... 414/421; 414/292; 414/303; 414/639; 298/7; 298/11
[58] Field of Search .............. 414/291–292, 414/303, 405, 419, 421, 425, 639; 298/7, 11

[56] References Cited

U.S. PATENT DOCUMENTS

| | | | |
|---|---|---|---|
| 2,756,883 | 7/1956 | Schreck | 414/620 X |
| 2,822,113 | 2/1958 | Joiner, Jr. | 414/421 X |
| 4,221,523 | 9/1980 | Eberle | 414/421 |
| 4,569,623 | 2/1986 | Goldmann | 414/421 X |

FOREIGN PATENT DOCUMENTS

| | | | |
|---|---|---|---|
| 0207327 | 11/1984 | Japan | 414/421 |
| 1265091 | 10/1986 | U.S.S.R. | 414/421 |

OTHER PUBLICATIONS

Hercules Industries pamphlet entitled Drum and Container Dumpers (1987)—20 pages.

Primary Examiner—Michael S. Huppert
Assistant Examiner—James Keenan
Attorney, Agent, or Firm—Flynn, Thiel, Boutell & Tanis

[57] ABSTRACT

A dumper for use in dumping the contents of a container. The dumper includes a hollow receiving portion for receiving therein at least an upper end of the container and an outlet portion for guiding contents emanating from the container to a desired location. A mechanism for effecting a relative movement between the receiving portion and the upper end of the container and an orientation of the receiving portion onto the upper end of the container is provided. An inflatable bladder mechanism is mounted on an inwardly facing surface of the receiving portion and oriented to engage a peripheral side surface of the container, when inflated, with sufficient force to clamp and hold the container to the receiving portion. A tipping mechanism is also provided for tipping the receiving portion and the container in unison only when the bladder is inflated.

11 Claims, 7 Drawing Sheets

LIFT AND SEAL DRUM DUMPER

FIELD OF THE INVENTION

This invention relates to a dumper for use in dumping the contents of a container and, more particularly, to a dumper having an automated mechanism for clamping the container into a fixed position to enable the container to be tipped for purposes of dumping the contents.

BACKGROUND OF THE INVENTION

A variety of dumpers are known which can dump the contents of a container. These dumpers require that a container first be placed onto a platform, which platform is generally tiltable about an axis through an angle of at least 90° so that the container mounted thereon will be tipped on its side to allow the contents therein to be emptied. It is generally necessary to secure the container to the platform so that relative movement between the container and the platform will not occur as the platform and container are tilted in unison. Various devices are known for securing the container to the platform, such devices including straps and the like which are manually applied around the container. This manual application of a device for effecting a securement of the container to the platform is slow and oftentimes cumbersome.

In instances where the contents of the container is a fine powder or a toxic chemical, it is necessary to empty the contents of the container carefully so that powder dust and/or toxic chemical vapors will not spill out into the area surrounding the dumper. In these instances, it is desirous to dump the contents of the container into a chamber that is sealingly engaged with the container. To accomplish this, the platform with the container thereon has been driven upwardly so that the upper rim portion of the container is driven into engagement with a seal located at the mouth of the entrance to the chamber so that the interior of the container will be sealingly connected to the inlet to the chamber. However, the seal so formed between the container and the chamber forms a dam which partially blocks the flow of contents in the container into the chamber when the container is tilted in unison with the platform. As a result, all of the contents of the container cannot be dumped into the chamber, even if the container is tipped completely upside down. As a result, when the container is returned to its upright position and the platform lowered to enable the container to be removed and replaced with another one, the open top container still has contents therein which if in powder form or toxic chemical form can cause powder dust or toxic fumes to surround the dumper.

Accordingly, it is an object of this invention to provide a dumper for use in dumping the contents of a container which has an automated clamping feature which will effect an automatic clamping of the container to the dumper prior to the container being tipped at an angle to facilitate the dumping of the drum contents.

It is a further object of this invention to provide a dumper, as aforesaid, in which the container is sealingly connected to a chamber so that the container contents will be dumped into the chamber as the container is tipped on its side and without partially blocking the flow of contents from the container.

It is a further object of this invention to provide a dumper, as aforesaid, wherein the mechanism which effects a clamping of the container to the dumper simultaneously effects a seal around the sides of the container thereby keeping the top of the container free of obstruction as the container is tipped on its side for purposes of dumping the container contents.

It is a further object of this invention to provide a dumper, as aforesaid, wherein the mechanism for clamping the container to the dumper is automatically activated in response to the presence of the container.

It is a further object of this invention to provide a dumper, as aforesaid, which is capable of dumping right cylinder cylindrical drum containers.

It is a further object of the invention to provide a dumper, as aforesaid, which is durably constructed and easy to operate.

SUMMARY OF THE INVENTION

In general, the objects and purposes of the invention are met by providing a dumper for use in dumping the contents of a container, which dumper includes a hood having a hollow receiving portion for receiving therein at least an upper end of the container and an outlet portion for guiding the contents emanating from the container to a desired location. The dumper also includes a mechanism for effecting a relative movement between the receiving portion and the upper end of the container and an orientation of the receiving portion onto the upper end of the container. An inflatable bladder device is mounted on an inwardly facing surface of the receiving portion and oriented to engage a peripheral surface of the container, when inflated, with sufficient force to clamp and hold the container to the receiving portion. A tipping mechanism is provided for tipping the receiving portion and the container in unison only when the bladder is inflated so as to prevent relative movement between the receiving portion and the container from occurring when the container is tipped over for purposes of effecting a dumping of the contents of the container and a delivery of the contents to the outlet portion.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

DETAILED DESCRIPTION

FIGS. 1-5 illustrate various views of a dumper 10 embodying the invention. The dumper 10 includes a base frame 11 having a pair of upstanding, laterally spaced and parallel sidewalls 12 and 13 and bracing 14 connected to and extending between the sidewalls 12 and 13. The bracing 14 is composed of a pair of laterally extending and vertically spaced frame members 16 and 17 oriented so as to interconnect the sidewalls 12 and 13 along the left edge (FIG. 1) thereof to define a rightwardly opening (FIG. 1) U-shaped configuration. As is illustrated best in FIG. 4, the laterally spaced sidewalls 12 and 13 define a container receiving zone 18 therebetween.

Figure 1:
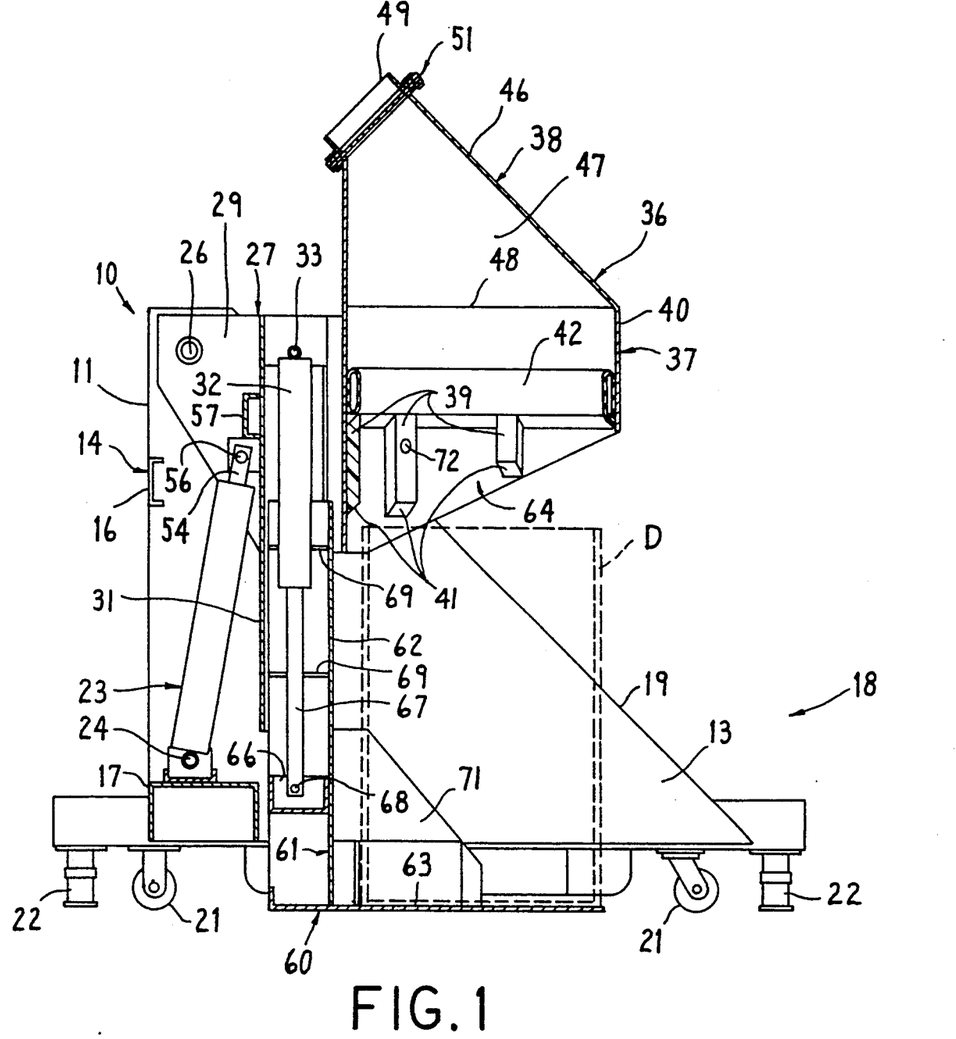
FIG. 1 is a side elevational view of a dumper embodying the invention.

In this particular embodiment, the frame member 17 interconnects the sidewalls 12 and 13 adjacent the floor whereas the frame member 16 extends parallel thereto and is oriented adjacent the top of the sidewalls 12 and 13. Further, the sidewalls 12 and 13 are identical and have a frontwardly facing sloped surface 19 inclined from high to low from the ends of the sidewalls 12 and 13 adjacent the bracing 14 toward the free ends thereof which straddle the opening to the receiving opening. The bottom surface of each of the sidewalls 12 and 13 has a plurality of wheels 21 thereon and a plurality of floor locks 22 which renders the wheels immovable.

A power hydraulic cylinder 23 is pivotally mounted as at 24 to the upper surface of the frame member 17. A pair of horizontally extending stub shafts 26 extend inwardly toward one another from the upper edge of each of the sidewalls 12 and 13. A tilt frame assembly 27 is pivotally secured to the stub shafts 26 and is pivotal about the axis of the stub shafts 26. More specifically, the tilt frame assembly 27 includes a pair of laterally spaced side plates 28 and 29 that are oriented inwardly of and extend generally parallel to the sidewalls 12 and 13 and are pivotally connected by a bearing (not specifically illustrated) to the stub shafts 26. The side plates 28 and 29 are connected by a wall 31 which extends generally perpendicular to the side plates 28 and 29. To the front (right facing side in FIG. 1) of the wall 31 there is provided a pair of laterally spaced power cylinders 32, each one being secured to a separate one of the side plates 28 and 29 by a lug bolt 33. The purpose of the power cylinders 32 will be described in more detail below.

Figure 7:
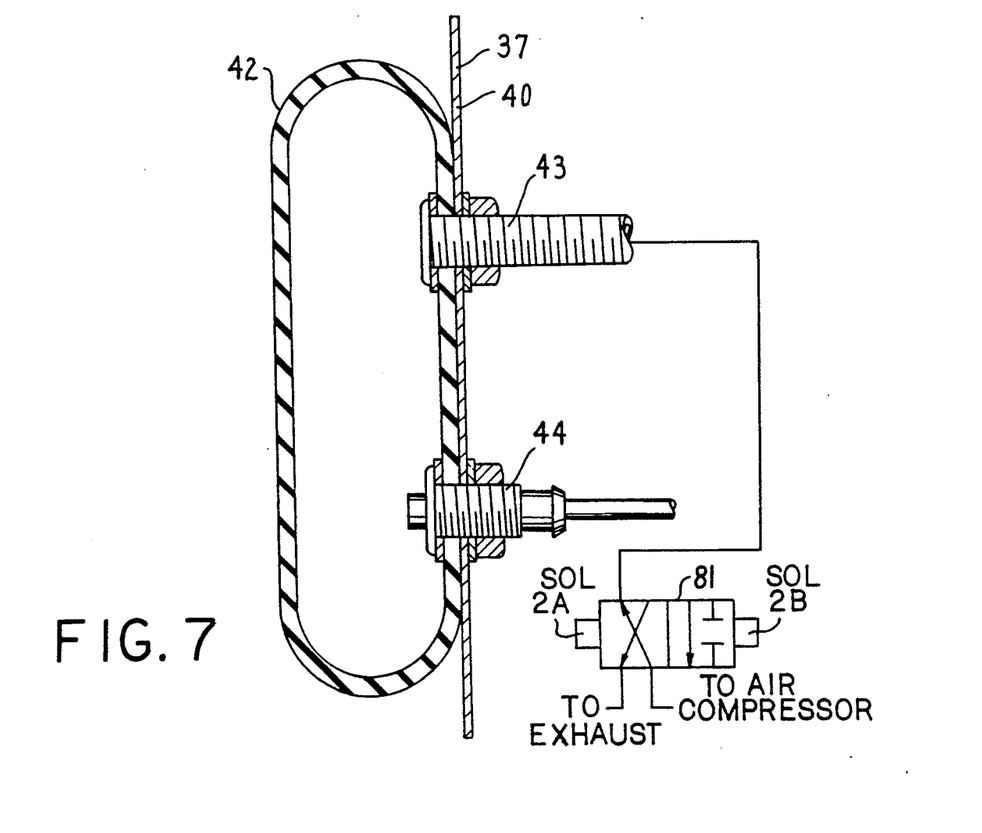
FIG. 7 is a sectional view illustrating a securement of the inflatable bladder to the interior of a hood assembly and the air supply therefor.

The tilt frame assembly 27 includes a hollow hood assembly 36 secured to the front edges (right edges in FIG. 1) of the side plates 28 and 29. The hood assembly 36 includes a hollow receiving portion 37 and a hollow outlet portion 38 connected end-to-end. In this particular embodiment, the power cylinders 32 are oriented between the wall 31 and the hood assembly 36. The receiving portion 37 is generally cylindrical and opens, when in an initial position thereof, downwardly toward the floor on which the dumper 10 is supported. A plurality of laterally spaced hard plastic (ABS) guide strips 39 are provided on the front (right) facing side of an interior surface of a wall 40 on the receiving portion, the lower ends of which are bevelled as at 41. An annular inflatable bladder 42 is oriented adjacent the upper ends of the guide strips 39 and is bolted to the internal surface of the receiving portion 37 by any convenient means, such as bolts (not illustrated). An enlarged cross section of the annular inflatable bladder 42 is illustrated in FIG. 7. An air inlet connection 43 extends through the wall 40 of the receiving portion 37 into the interior of the bladder 42. A pressure monitoring connection 44 also extends through the wall 40 of the receiving portion 37 into the interior of the bladder 42. The operation of the bladder will be explained in more detail below.

Figure 4:
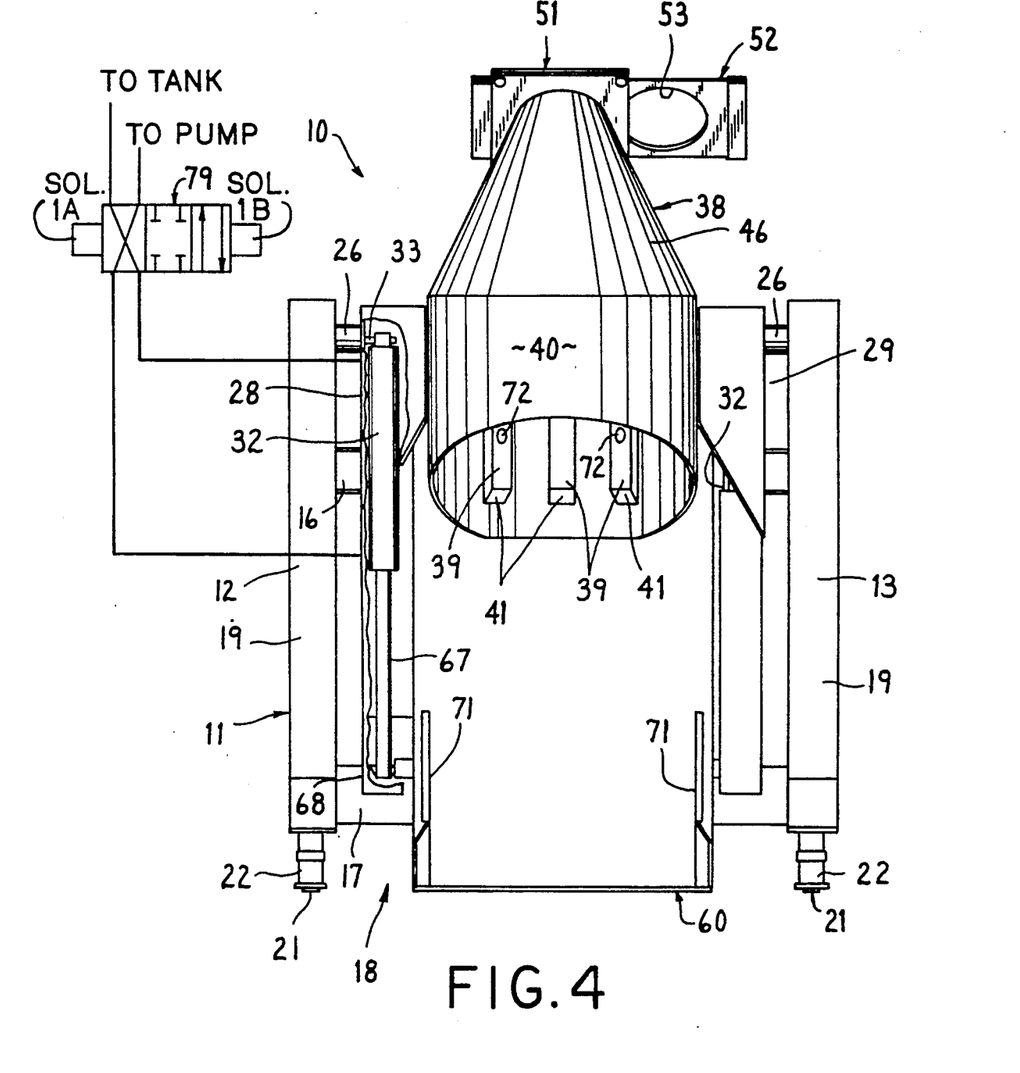
FIG. 4 is a right side elevational view of the dumper illustrated in FIG. 1.
Figure 5:
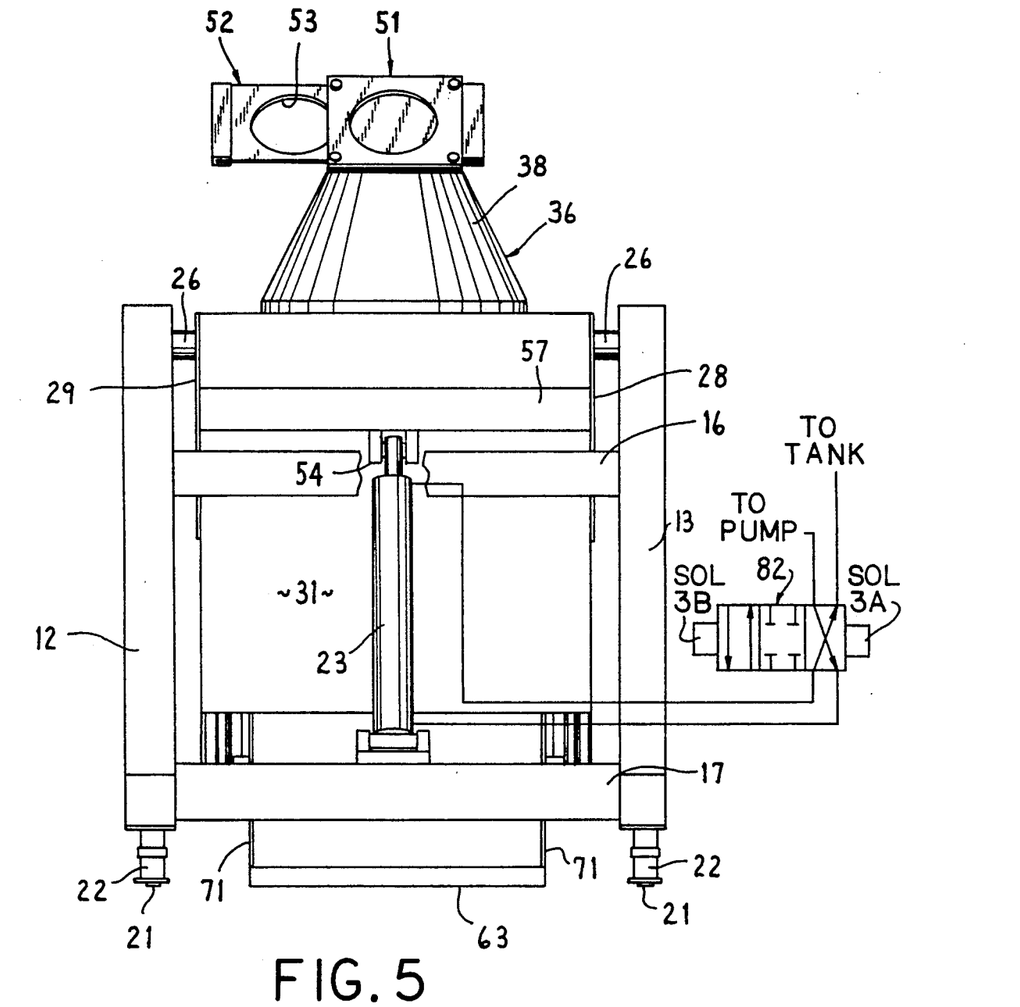
FIG. 5 is a left side elevational view of the dumper illustrated in FIG. 1.

The outlet portion 38 of the hood assembly 36 includes a generally conical-like wall 46 defining a funnel-shaped chamber 47 having a large diameter end 48 at the juncture between the receiving portion 37 and the outlet portion 38 and a small diameter end 49 at an end of the outlet portion 38 remote from the receiving portion. An openable and closable gate 51 is provided at the small diameter end 49. In this particular embodiment, the gate 51, when closed, forms an airtight seal. As shown in FIG. 4, the gate 51 includes a plate-like slide mechanism 52 having a single opening 53 therein adapted to become aligned with the small diameter end 49 when the slide 52 is moved to the opened condition thereof. The gate is otherwise in the closed condition as illustrated in FIG. 4.

A reciprocal piston rod 54 of the power cylinder 23 is pivotally connected as at 56 to the rear facing side of the wall 31 just beneath a laterally extending tilt frame member 57. As the piston rod 54 is driven out of the power cylinder 23, a moment is defined about the axis of the stub shafts 26 to cause the tilt frame assembly 27 to pivot from the position illustrated in FIG. 1 to the position illustrated in FIG. 3 about the axis of the stub shafts.

The tilt frame assembly 27 also includes an elevatable platform assembly 60 oriented between the sidewalls 12 and 13 of the base frame 11 and particularly in the container receiving zone 18. The elevatable platform assembly 60 includes a generally L-shaped frame 61 having a vertically upright wall 62 and a generally horizontally aligned platform 63 extending frontwardly (rightwardly) of the upright wall 62. The platform 63 is generally parallel with the floor supporting the dumper 10 and is oriented directly beneath an opening 64 into the interior of the receiving portion 37 of the hood assembly 36. The wall 62 of the elevatable platform assembly 60 is oriented between the wall 31 of the base frame 11 and the generally cylindrical wall 40 of the receiving portion 37 of the hood assembly 36. A bracket member 66 is secured to the rear side of the wall 62 and the piston rods 67 of the power cylinders 32 are respectively pivotally connected to the bracket as at 68. Other bracing components 69 can be employed along the height of the wall 62 in order to strengthen the wall 62. Thus, as the piston rods 67 are simultaneously retracted into the power cylinders 32, the elevatable platform assembly 60 will be drawn upwardly to orient the platform 63 closer to the lower edge of the receiving portion 37 of the hood assembly 36, namely, the opening 64.

Figure 2:
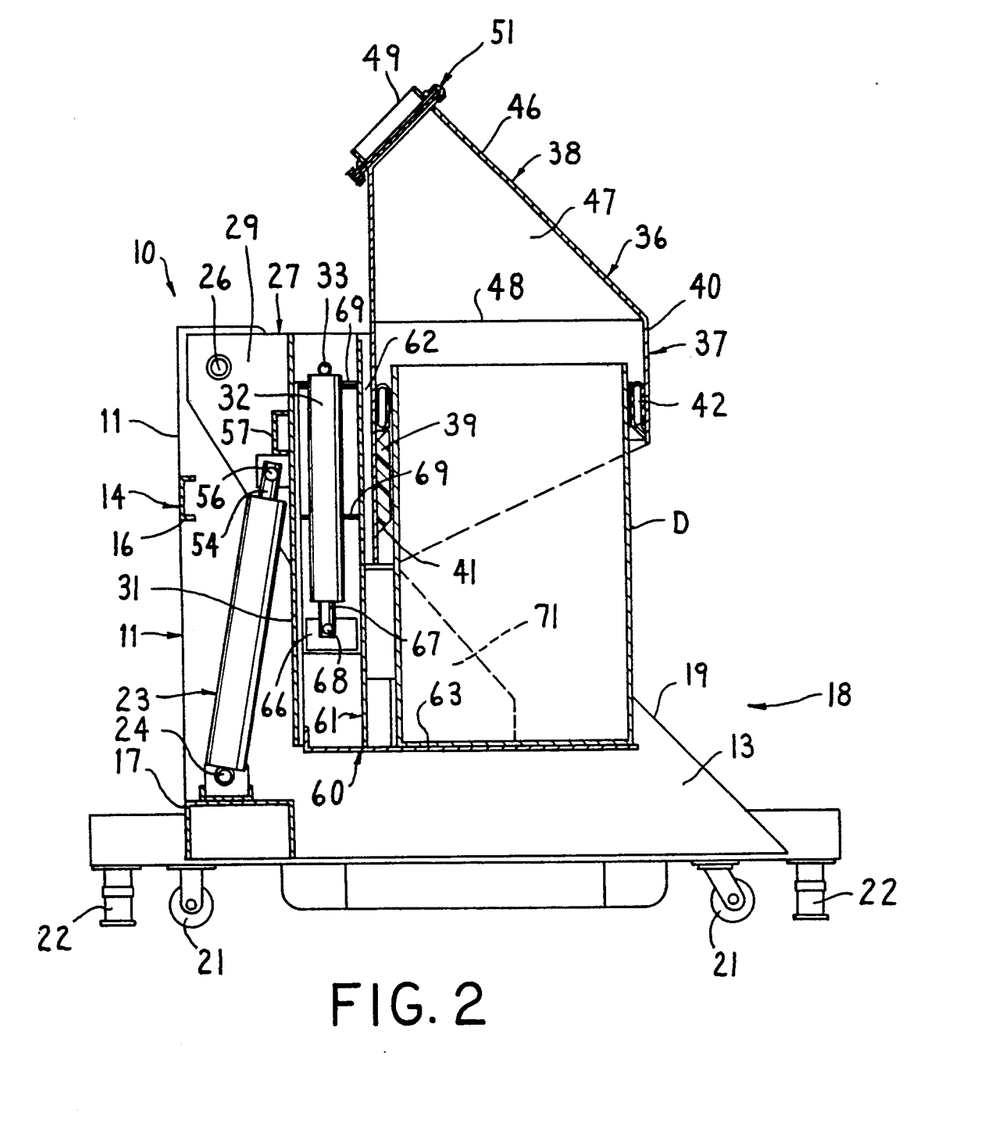
FIG. 2 is a side elevational view of the dumper illustrated in FIG. 1, but with the elevatable platform assembly moved to an elevated position with the container thereon.
Figure 3:
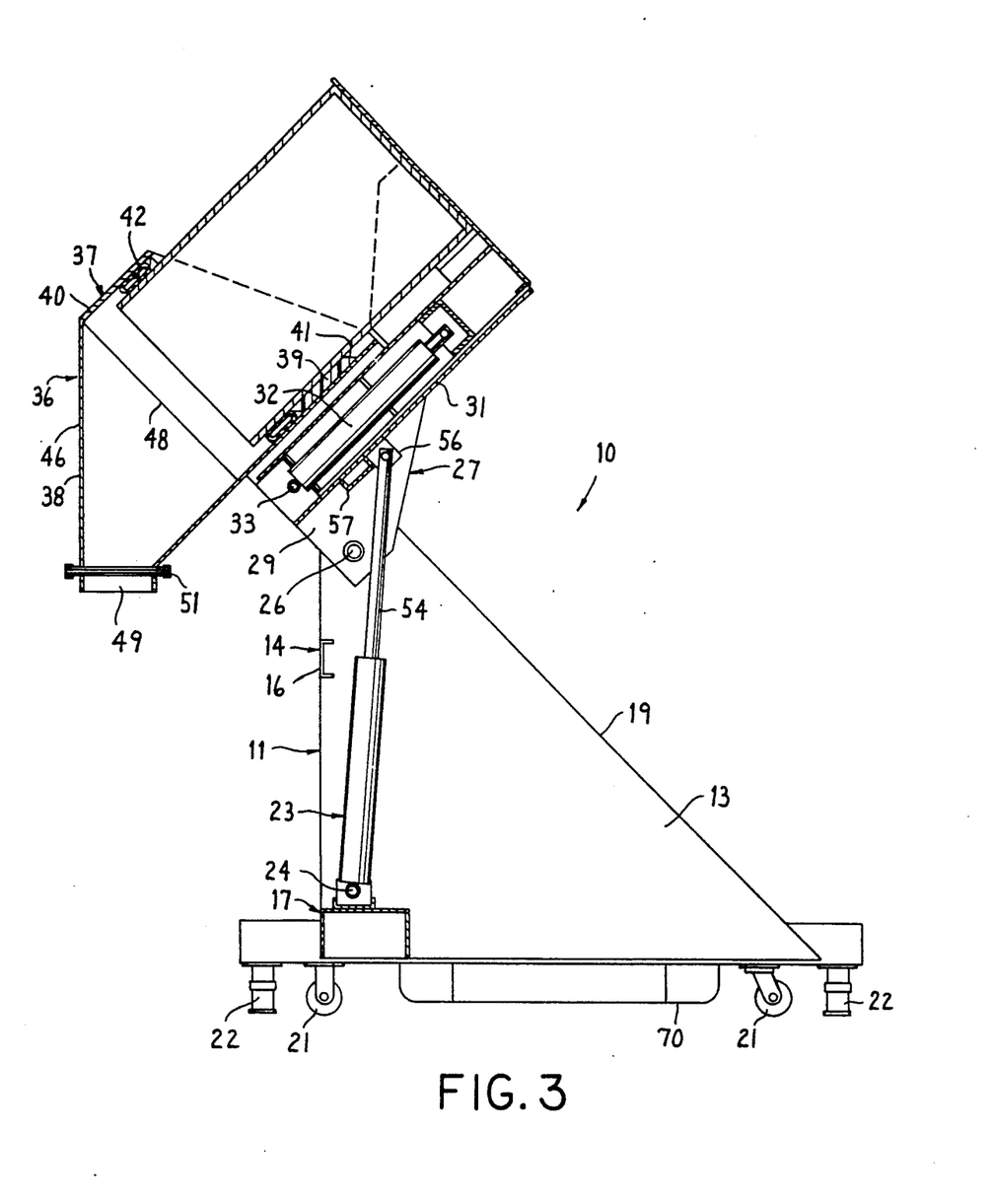
FIG. 3 is a side elevational view of the dumper illustrated in FIGS. 1 and 2, but with the tilt frame assembly tilted to facilitate the dumping of the container contents.
Figure 8:
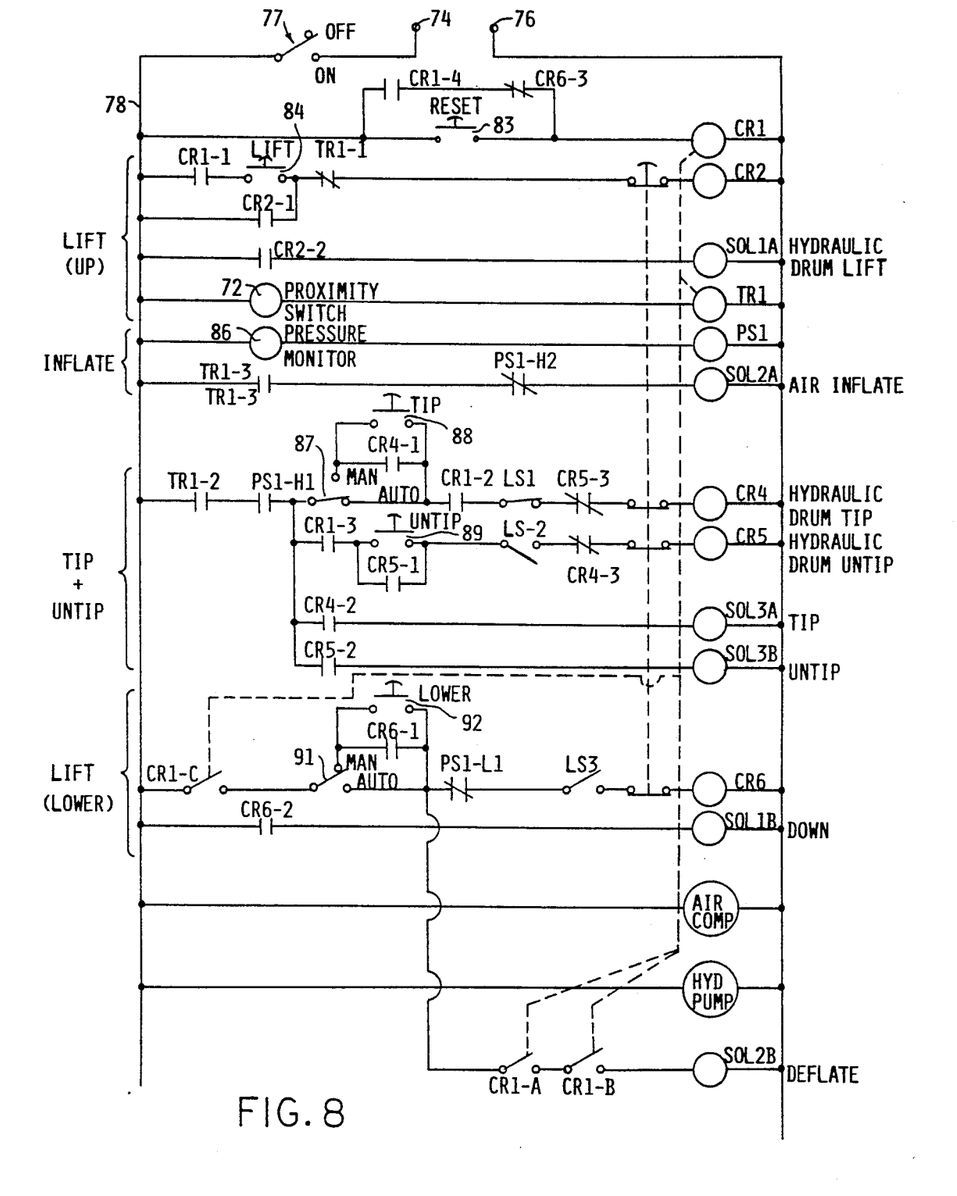
FIG. 8 is an electrical, pneumatic and hydraulic circuit for effecting an automated operation of the dumper.

Since the bladder 42 is adapted to be inflated by air under pressure and the power cylinders 23 and 32 are each adapted to be hydraulically driven, the air compressor and hydraulic pump need to supply their respective outputs to the dumper 10. An inlet panel 70 can be provided on one of the sidewalls, such as the sidewall 13 of the base frame 11 as illustrated in FIGS. 1 to 3. Appropriate and not illustrated hose connections can be provided to the panel 70 to facilitate air and hydraulic fluid to be supplied to the respective components. Further detailed discussion concerning the pneumatic air connections and the hydraulic connections is believed unnecessary. However, the air compressor and the hydraulic pump as well as the controls for the hydraulic valves 79, 81 and 82 are illustrated in FIG. 8.

If desired, laterally spaced side panels 71 can be provided on the elevatable platform assembly 60 and serve to strengthen the interconnection of the platform 63 with the upstanding wall 62 and guide a container onto the platform 63.

Figure 6:
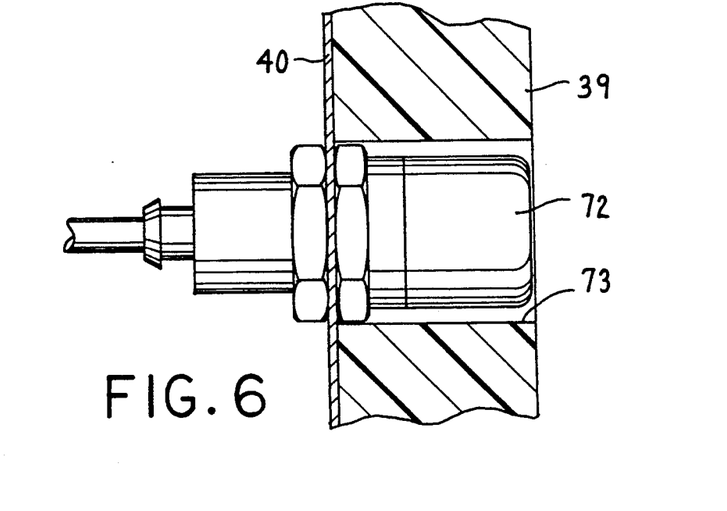
FIG. 6 is a fragmentary sectional view illustrating a proximity switch mounting.

A pair of proximity switches 72 are received in corresponding holes 73 in selected ones of the guide strips 39 as illustrated in FIGS. 4 and 6. Each proximity switch is adapted to detect the presence of a container and provide a signal indicative of the container being present adjacent thereto, so that additional circuitry can be activated, particularly circuitry illustrated in FIG. 8 and which will be discussed in more detail below.

A right cylinder cylindrical drum D is illustrated in broken lines in FIG. 1 and is adapted to be placed onto the elevatable platform assembly 60, particularly the platform 63 between the laterally spaced side panels 71. The outer diameter of the drum D is less than the inner diameter of the annular inflatable bladder 42 when the bladder is deflated. However, the outer diameter of the drum is greater than the inner diameter of the inflatable bladder 42 when the bladder 42 is inflated.

The electrical, pneumatic and hydraulic schematic diagram illustrated in FIG. 8 represents only one of many ways for effecting an appropriate control of the dumping of any contents that will be present in a container/drum D. Electrical power is supplied to the inlet terminals 74 and 76. An ON/OFF switch 77 controls the application of power to the line 78. Thus, with the switch turned to the "ON" condition, electrical power will be supplied to the lines 78 and 76. A resetting circuit comprising a control relay CR1 is connected between the lines 76 and 78, particularly, a reset switch and a normally open set of contacts CR1-4 of the control relay CR1 and a normally closed set of contacts CR6-3 of a control relay CR6 that will be explained in more detail below. Thus, upon a closing of the reset switch 83, the control relay CR1 will be activated to cause the normally open contact CR1-4 to become closed to hold the control relay CR1 fully energized. All other contacts of the control relay CR1, namely, CR1-1, CR1-2, CR1-3 and CR1-5 become closed. Latching contacts CR1-A, CR1-B and CR1-C are opened. The time relay TR1 is also reset and the contacts thereof changed to the condition shown in FIG. 8.

Assuming that a drum D has been placed onto the elevatable platform assembly 60 and it is desired to dump the contents thereof, the lift switch 84 is closed to activate the control relay CR2 which causes the contacts thereof, namely, CR2-1 and CR2-2 to become closed thereby holding the control relay CR2 fully activated and simultaneously activating the solenoid SOL 1A on a valve 79 illustrated in FIG. 4. The solenoid SOL 1A on the valve 79 causes the valve to shift from the centered neutral position to the position illustrated in FIG. 4 to effect a delivery of hydraulic fluid to the power cylinders 32 to cause the elevatable platform assembly 60 to lift vertically upwardly to locate the upper end of the drum D into the receiving portion 37 of the hood assembly 36. As the upper edge of the drum D moves past the proximity switches 72, the proximity switch 72 will cause a timer relay TR1 to be activated to begin timing a specific interval of time. The solenoid SOL 1A will continue to keep pressurized hydraulic fluid supplied to the power cylinders 32 through the valve 79 to continue the movement upward of the drum D. The timer relay TR1 will eventually time out after four seconds causing the contacts TR1-1, TR1-2 and TR1-3 to change their state. An opening of the contacts TR1-1 will deactivate the control relay CR2 to cause all of the associated contacts thereof to return to their original condition illustrated in FIG. 8. This will cause a deactivation of the solenoid SOL 1A on the valve 79, returning the valve to the center neutral position to stop all upward movement.

The switch LS3 became closed the moment the elevatable platform assembly left its lowermost position illustrated in FIG. 1. Since the rate of upward movement of the elevatable platform assembly 60 is known, four seconds assures that the plane of the upper end of the container/drum D will be oriented well above the plane of the annular bladder 42 at the moment upward movement is stopped. Simultaneously, and due to the contacts TR1-3 becoming closed at time out, the solenoid SOL 2A on a valve 81 (FIG. 7) is activated to shift the valve to the position illustrated in FIG. 7 causing air to be supplied to the inflatable bladder 42. Tipping of the container/drum D cannot commence until the air pressure inside the bladder is sufficient to cause a sealing engagement of the bladder with the peripheral surface of the container/drum D. However, once the pressure inside the bladder 42 has reached a predetermined level indicative of a tight clamping of the container/drum D to the tilt frame assembly 27, a pressure monitoring switch 86 will effect a closing of a set of high pressure contacts thereon, namely, contacts PS1-H1 and an opening of the contacts PS1-H2 to deactivate the solenoid SOL 2A without altering the position of the valve. The set of contacts PS1-L1 will open due to high pressure now being present inside the bladder. Since the contact TR1-2 became closed when the timer relay TR1 timed out, and assuming that the control switch 87 is in the automatic ("AUTO") position, the control relay CR4 will become activated to cause the contact CR4-2 to become closed to activate the solenoid SOL 3A of a valve 82 illustrated in FIG. 5. If the control switch 87 is in a manual position ("MAN"), a closing of the "TIP" switch 88 will also begin the tipping operation. Activation of the solenoid SOL 3A causes the valve 82 to shift from the centered neutral position to the position illustrated in FIG. 5 causing hydraulic fluid to be delivered to the lower end of the power cylinder 23 to drive the piston rod 54 thereof upwardly to cause a tilting of the tilt frame assembly 27 about the axis of the stub shafts 26 toward the position illustrated in FIG. 3. The tipping movement continues until the limit switch LS1 is contacted when the tilt frame assembly 27 reaches the position illustrated in FIG. 3, at which time the limit switch LS1 opens to deactivate the control relay CR4 and open the contacts CR4-2 to remove power from the solenoid SOL 3A and cause the valve 82 to shift back to the centered neutral position. The limit switch LS2 became closed the moment tipping movement began. At this particular moment in time, the latch contact CR1-A is closed. The dumper 10 can remain in the position illustrated in FIG. 3 for as long as desired. If desired, the supply of hydraulic fluid can be shut off as long as the power cylinder 23 remains locked in its extended position. The contents flowing out of the drum can be regulated by the gate mechanism 51.

Since the bladder 42, when inflated, has an inner diameter less than the outer diameter of the drum D, the bladder will effectively hold the drum in position when the tilt frame assembly 27 has been moved to the position illustrated in FIG. 3. Further, the engagement of the bladder with the peripheral side surface of the drum D will be sufficient to generate a seal thereat and, when the gate 51 is closed, the interior of the hood assembly 36 will be a sealed chamber. Thus, any dust particles and/or toxic fumes that may be present in the drum contents will be prevented from escaping to the work area around the dumper 10.

When it is deemed time to untip the drum D, namely, return the tilt frame assembly 27 to the position illustrated in FIG. 2, it is necessary to close the "UNTIP" switch 89 to activate the control relay CR5 through the now closed set of contacts CR1-3 and CR4-3 and the now closed limit switch LS2 which became closed when the tilt frame assembly 27 moved away from the FIG. 2 position toward the FIG. 3 position. The control relay CR5 is locked on due to a closing of the contact CR5-1 connected in parallel with the "UNTIP" switch 89. Closing of the contact CR5-2 of the control relay CR5 will activate the solenoid SOL 3B on the valve 82 causing the valve to shift from the centered neutral position to effect delivery of pressurized hydraulic fluid to the upper end of the cylinder 23 to cause the piston rod 34 to be retracted. This movement will continue until the limit switch LS2 becomes opened when the tilt frame assembly 27 reaches the FIG. 2 position at which time the control relay CR5 is deactivated to remove power from the solenoid SOL 3B to cause the valve 82 to return to the centered neutral condition. The latch contacts CR1-B and CR1-C also become closed at this time.

If the elevatable platform assembly 60 is to be manually lowered thereafter, a control switch 91 supplies power to the "LOWER" switch 92 which causes power to be supplied through the now closed contacts CR1-A and CR1-B to activate the solenoid SOL 2B of the pneumatic valve 81 illustrated in FIG. 7. Activation of the solenoid 2B will shift the valve to cause the air pressure within the bladder 42 to become connected to exhaust which will cause the high pressure set of contacts on the pressure switch PS1, namely, the set of contacts PS1-H1 and PS1-H2, to return to the initial condition, while the low pressure set of contacts PS1-L1 will again become closed as the pressure reaches a low level indicating that the bladder is no longer engaged with the peripheral surface of the drum. The limit switch LS3 became closed when the elevatable platform assembly 60 left its lowered position shown in FIG. 1 so that once the contacts PS1-L1 become closed indicating that the bladder has retracted away from the peripheral surface of the drum, the control relay CR6 becomes activated to cause the contact CR6-1 to open to deactivate the control relay CR1. The contact CR6-4 becomes closed to lock on the control relay CR6. The contact CR6-2 becomes closed to activate the solenoid SOL 1B of the valve 79 illustrated in FIG. 4 to bring about a delivery of pressurized hydraulic fluid to the upper end of the power cylinders 32 to drive the elevatable platform assembly 60 downwardly to the FIG. 1 position. When the elevatable platform assembly 60 reaches its lowermost position illustrated in FIG. 1, the limit switch LS3 will open to deactivate the control relay CR6 to cause the valve 79 to return to its centered neutral position.

In order to proceed through another cycle of operation, it will be necessary to close the reset switch as described above which will cause the latch contacts CR1-A, CR1-B and CR1-C to again become opened and a resetting of the timer relay TR1.

The timer relay TR1 is generally set to operate for a four second interval of time before causing the contacts TR1-1 to TR1-3 to change their state. The four second interval is deemed to be long enough to cause the upper edge of the drum D to move well past the upper edge of the bladder. Thus, it is not necessary to locate electrical contact switches within the chamber defined by the hood assembly 36. This becomes extremely important when flammable materials are being passed through the hood assembly 36. All electrical contacts are oriented outside the hood assembly in this particular arrangement.

A drop in air pressure inside the bladder during a tipping function will cause the pressure monitoring switch 86 to activate an altering of the contacts thereon to effect a deactivation of the tipping function. The tipping function cannot be reactivated until the pressure monitoring switch 86 detects a reestablishment of a sufficient pressure inside of said bladder.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A dumper for use in dumping the contents of a container, comprising:
  a hood having a hollow receiving means for receiving therein at least an upper end of the container, and an outlet means for guiding contents emanating from the container to a desired location, said outlet means being a hollow and enclosed chamber with an openable and closable gate means thereon at a location remote from said receiving means;
  means for effecting a relative movement between said hollow receiving means and the upper end of the container thereby orienting said upper end of the container inside said hollow receiving means, so that the upper end of the container, when received inside of said hollow receiving means, is entirely open with unobstructed access to said outlet means being provided to the contents in the container, so that all of the contents in the container can be emptied into said outlet means when the container is tipped;
  an inflatable bladder means mounted on an inwardly facing surface of said hollow receiving means and oriented to solely engage a peripheral side surface of the container, when inflated, with sufficient force to clamp and be the only holder of the container to said hollow receiving means and provide a sealed connection with the container so that said chamber, when said gate means is closed and said bladder is inflated, is sealed off from external conditions; and tipping means for tipping said receiving means and said container in unison only when said bladder is inflated so as to prevent relative movement between said receiving means and said container from occurring when said container is tipped over for purposes of effecting a dumping of the contents of the container and a delivery of the contents to the outlet means.

2. The dumper according to claim 1, wherein said hollow receiving means and said outlet means are united and said tipping means effects a tipping in unison of said receiving means and said outlet means.

3. The dumper according to claim 1, wherein the container is a right cylinder cylindrical drum container; and wherein said bladder is an annular ring mounted to said inwardly facing surface of said hollow receiving means; and wherein at least an upper end of a top opened drum container is received in said receiving means and encircled by said bladder, said bladder, when inflated, uniformly engaging solely the entire peripheral surface of the drum container to define a seal thereat to thereby effect an isolation of said chamber from external conditions.

4. The dumper according to claim 3, wherein said outlet means forms a funnel large in diameter at a juncture thereof with said receiving means and small in diameter at an end remote from said receiving means, said gate means being oriented in said small diameter end.

5. The drum dumper according to claim 1, wherein said tipping means further includes a means for sensing a gas pressure inside of said inflatable bladder and for halting a tipping in response to a sensed gas pressure insufficient to form said sealed connection.

6. A drum dumper for use in dumping the contents of a drum container having a finite first cross sectional area, comprising:

a base frame;

a tilt frame and pivot means for pivotally mounting said tilt frame on said base frame;

first drive means for effecting a relative tilting movement between said tilt frame and said base frame about said pivot means;

an elevatable platform mounted on said tilt frame and adapted to support a top opened drum container in a vertically upright condition thereon;

a second drive means for effecting a lifting and a lowering of said elevatable platform on said tilt frame;

a hollow hood on said tilt frame located vertically above said elevatable platform, said hood having a first part open at an end thereof facing said elevatable platform;

an inflatable annular bladder mounted on an inside facing surface of said first part, an inside facing surface of said bladder, when uninflated, defining an opening having a second cross sectional area that is greater than said first cross sectional area and, when inflated, defining a third cross sectional area that is less than said first cross sectional area; and means for inflating said bladder in response to an upper end of the drum container being received in said first part and oriented above said bladder to cause an engagement of said inside facing surface of said bladder solely with a peripheral surface of the drum container with a sufficient force to clamp and be the only holder of the peripheral surface of the drum container so as to prevent a relative movement between the drum container and said tilt frame when said tilt frame is driven by said first drive means about said pivot means, said means for inflating said bladder further including a control means activated by a detected presence of the upper end of the drum container in said first part of said hood caused by said second drive means lifting said elevatable platform with the drum container thereon, said control means, after a finite time interval following the detected presence of the upper end of the drum container, effecting a halting of the lifting of said elevatable platform and a simultaneous initiating of an inflation of said bladder.

7. The drum dumper according to claim 6, wherein said first part of said hollow hood is cylindrical in shape, said annular bladder being mounted to the inside facing surface of said cylindrical first part, said hood also having an outlet funnel-shaped chamber large in diameter at a juncture thereof with said first part and small in diameter at an end remote from said first part.

8. The drum dumper according to claim 7, wherein said hood includes an openable and closable gate oriented in said small diameter end.

9. The drum dumper according to claim 8, wherein said bladder, when inflated, forms a seal with the peripheral surface of the drum container thereby isolating an interior of said outlet funnel-shaped chamber from external conditions when said gate means is closed.

10. The drum dumper according to claim 9, wherein said first drive means further includes a means for sensing a gas pressure inside of said inflatable bladder and for halting a tipping in response to a sensed gas pressure insufficient to form said seal.

11. The drum dumper according to claim 6, wherein the upper end of the drum container, when inside of said first part, is entirely open with unobstructed access to an outlet from said hollow hood being provided to the contents in the drum container, so that all of the contents in the drum can be emptied in the outlet when the drum container is tipped.

* * * * *